US009553650B2

(12) United States Patent
Ponnuswamy

(10) Patent No.: US 9,553,650 B2
(45) Date of Patent: Jan. 24, 2017

(54) MU-MIMO IMPLEMENTATION WITH CONFIGURABLE ANTENNA SYSTEM

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 319 days.

(21) Appl. No.: 14/256,827

(22) Filed: Apr. 18, 2014

(65) Prior Publication Data

US 2015/0304011 A1 Oct. 22, 2015

(51) Int. Cl.
*H04L 12/803* (2013.01)
*H04L 12/911* (2013.01)
*H04B 7/06* (2006.01)
*H04B 7/04* (2006.01)

(52) U.S. Cl.
CPC .......... *H04B 7/0695* (2013.01); *H04B 7/0452* (2013.01); *H04B 7/061* (2013.01); *H04B 7/0608* (2013.01); *H04B 7/0613* (2013.01); *H04B 7/0617* (2013.01); *H04B 7/0686* (2013.01); *H04B 7/0691* (2013.01)

(58) Field of Classification Search
None
See application file for complete search history.

(56) References Cited

U.S. PATENT DOCUMENTS

| 2012/0002581 | A1* | 1/2012 | Anderson | H04W 72/005 370/312 |
| 2012/0071116 | A1* | 3/2012 | Gong | H04B 7/0408 455/114.2 |
| 2013/0157672 | A1* | 6/2013 | Chou | H04W 72/082 455/450 |
| 2014/0355493 | A1* | 12/2014 | Niu | H04L 12/189 370/280 |

* cited by examiner

*Primary Examiner* — Brandon Renner
(74) *Attorney, Agent, or Firm* — Brooks, Cameron & Huebsch, PLLC

(57) ABSTRACT

Disclosed herein is a system, apparatus, and method for using an antenna system comprising individually configurable antenna circuitries in a wireless network device to simulate the standard MU-MIMO transmissions as specified in the IEEE 802.11ac standard with antenna beamforming. The individually configurable antenna circuitries can be configured to transmit radio frequency (RF) signals with specific radiation patterns including directional beam patterns. Client devices may be grouped and antenna circuitries may be configured in such a way as to minimize inter-user interference. Frequent sounding-channel state feedback cycles and associated overhead are obviated with antenna beamforming, and no change to standard-compliant client devices is necessary. A better overall performance compared to MU-MIMO based on DSP-based beamforming as specified in the IEEE 802.11ac standard is expected.

22 Claims, 7 Drawing Sheets

MU-MIMO IMPLEMENTATION WITH CONFIGURABLE ANTENNA SYSTEM

FIELD

Embodiment of the disclosure relate to wireless digital networks, and in particular, to the problem of improving performance of MU-MIMO transmissions.

BACKGROUND

The IEEE 802.11ac standard specifies downlink (DL) Multi-User Multiple-Input Multiple-Output (MU-MIMO) transmissions, which enable a wireless network device, such as a wireless access point or a mesh node, to simultaneously transmit data to multiple client devices. Because spatial streams intended for different client devices are transmitted simultaneously, MU-MIMO transmissions are implemented with the digital signal processing (DSP)-based beamforming technique in order to manage inter-user interference. The implementation of MU-MIMO including beamforming needs to be efficient and accurate enough to focus specific spatial streams toward intended client devices while generating nulls toward the other clients that are part of the same MU-MIMO burst. In particular, to sufficiently reduce inter-user interference, very accurate cannel state information between the antennas of the wireless network device and the antennas of client devices is required. However, even if channel state information is obtained very frequently to account for fast changing channel states, the accuracy of channel state information is still limited by measurement, quantization, estimation, and other errors.

Moreover, as stated above, the need for very accurate channel state information in the operation of MU-MIMO calls for performance of sounding and feedback processes with a very high frequency. For example, in typical implementations the interval between two sounding and feedback cycles may be approximately 20 milliseconds (ms). The overhead associated with sounding and feedback processes at such a high frequency quickly becomes prohibitive as the number of active MU-MIMO client devices increases. For example, a significant impact on the overall throughput of the system can be expected with just more than a few active MU-MIMO client devices.

BRIEF DESCRIPTION OF THE DRAWINGS

The disclosure may best be understood by referring to the following description and accompanying drawings that are used to illustrate embodiments of the disclosure by way of example and not limitation. In the drawings, in which like reference numerals indicate similar elements.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

Disclosed herein, one embodiment of the disclosure is directed to a system, apparatus, and method for using an antenna system comprising individually configurable antenna circuitries in a wireless network device to simulate the standard MU-MIMO transmissions as specified in the IEEE 802.11ac standard with antenna beamforming. The individually configurable antenna circuitries can be configured to transmit radio frequency (RF) signals with specific radiation patterns including directional beam patterns. Client devices may be grouped and antenna circuitries may be configured in such a way as to minimize inter-user interference. Frequent sounding-channel state feedback cycles and the associated overhead are obviated with antenna beamforming, and no change to standard-compliant client devices is necessary. A better overall performance compared to MU-MIMO based on DSP-based beamforming as specified in the IEEE 802.11ac standard is expected.

Of course, other features and advantages of the disclosure will be apparent from the accompanying drawings and from the detailed description that follows below.

Embodiments of the disclosure utilize antenna beamforming techniques on the side of the wireless network device to simulate DL MU-MIMO transmissions that comply with technical specifications of the IEEE 802.11ac standard from the standpoint of client devices. Because the MU-MIMO transmissions comply with the IEEE 802.11ac standard from the standpoint of client devices, standard IEEE 802.11ac client devices may be used with embodiments of the disclosure without any modification.

Figure 1:
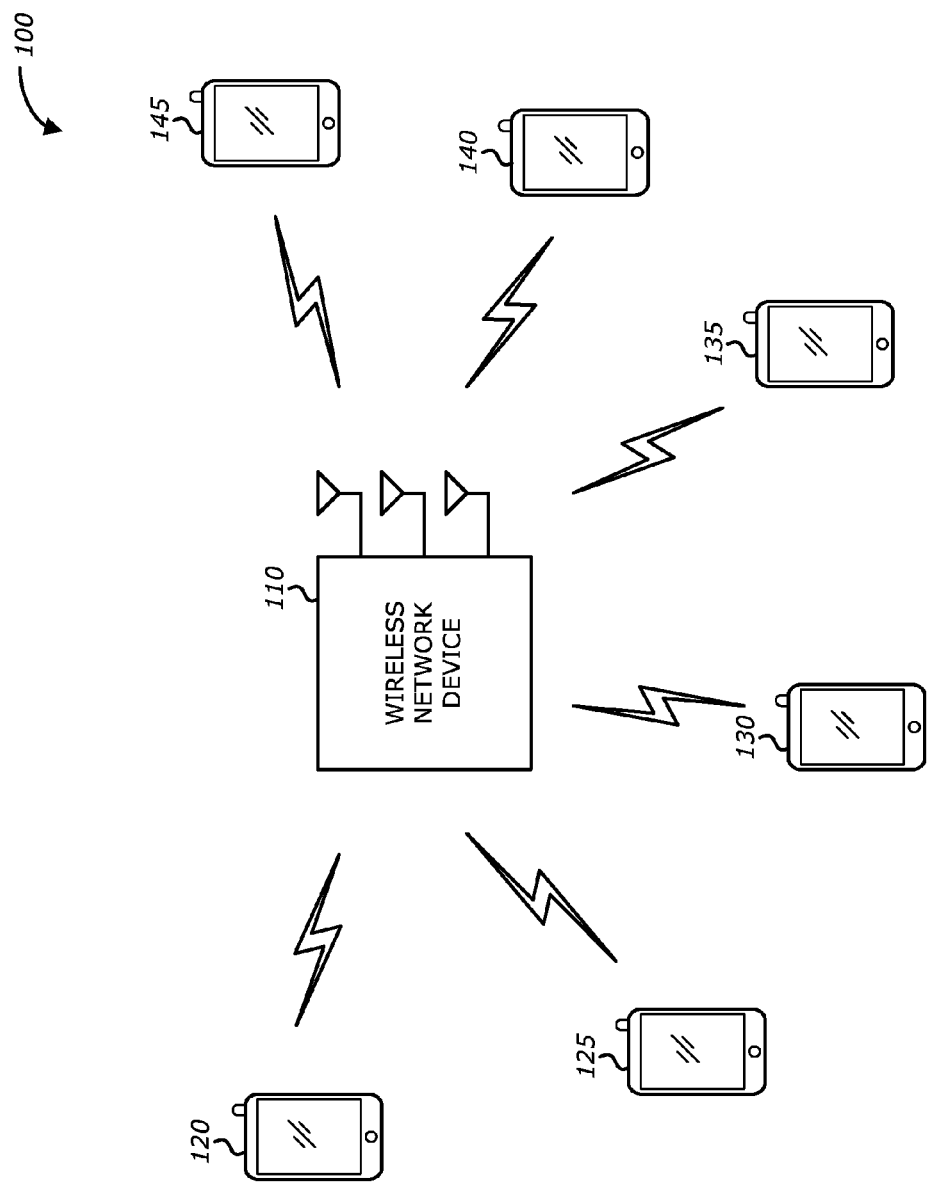
FIG. 1 illustrates an exemplary environment in which embodiments of the disclosure may be practiced.

FIG. 1 illustrates an exemplary environment 100 in which embodiments of the disclosure may be practiced. An exemplary wireless network device 110 provides data access services to one or more client devices through RF communications on one or more industrial, scientific, and medical (ISM) RF bands according to one or more versions of the IEEE 802.11 standards including the IEEE 802.11ac standard and thereby enables the client devices to access one or more data networks wirelessly. Six client devices 120, 125, 130, 135, 140, and 145 are illustrated in FIG. 1. The six illustrated client devices are IEEE 802.11ac-compliant, and are associated with wireless network device 110 for the data access service. It should be noted that additional client devices served by wireless network device 110 may exist, but are not shown in FIG. 1 in order not to obscure the disclosure. These additional client devices may comply with the IEEE 802.11ac standard, or may comply only with one or more lower versions of the IEEE 802.11 standards. The number of client devices being served by wireless network device 110 does not limit the invention.

Figure 2:
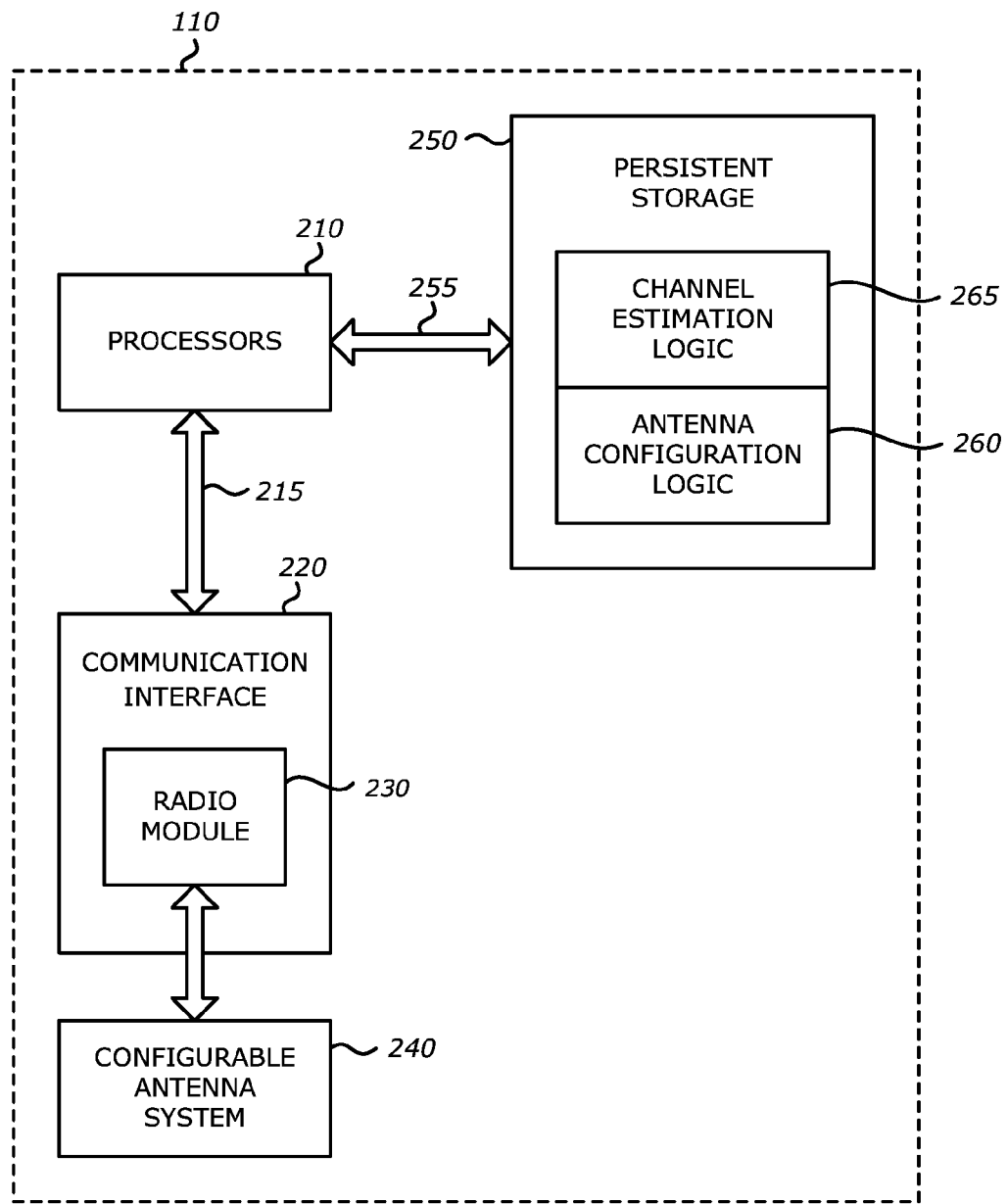
FIG. 2 is an exemplary block diagram of logic associated with a wireless network device.

Referring now to FIG. 2, an exemplary block diagram of logic associated with wireless network device 110 is shown. The wireless network device 110 comprises one or more processors 210 that are coupled to communication interface logic 220 via a first transmission medium 215. Communication interface logic 220 enables communications with the one or more data networks (not shown), with client devices such as client devices 120, 125, 130, 135, 140, and 145 of FIG. 1, and possibly with an external controller (not shown). Communication interface logic 220 may be implemented as one or more radio modules coupled to antennas for supporting wireless RF communications with other devices. In the embodiment illustrated in FIG. 2, a MIMO-capable radio module 230 is implemented. MIMO-capable radio module 230 is coupled to a configurable antenna system 240 comprising a plurality of individually configurable antenna circuitries, such as an exemplary configurable antenna system 300, which is described in detail below. Each individually configurable antenna circuitry may corresponds to one RF chain of radio module 230, and is capable of being configured to radiate RF signals with either an omnidirectional radiation pattern or a directional beam. In addition to the configurable beam direction, beam width, peak gain, and polarization of the beams may also be configurable for each individually configurable antenna circuitry. It should be noted that the definition of an antenna circuitry within the present disclosure is not necessarily consistent with the definitions of the same term in other patent applications or patents assigned to Aruba Networks Inc. The number of radio modules and the configuration of the antenna system including the number of individually configurable antenna circuitries do not limit the invention. Additionally, communication interface logic 220 may be implemented as a physical interface including one or more ports for wired connectors.

Processor 210 is further coupled to persistent storage 250 via transmission medium 255. According to one embodiment of the disclosure, persistent storage 250 may include antenna configuration logic 260 and channel estimation logic 265, etc., for the proper operation of wireless network device 110. Of course, when implemented as hardware, antenna configuration logic 260 and channel estimation logic 265, etc., would be implemented separately from persistent memory 250.

Figure 3:
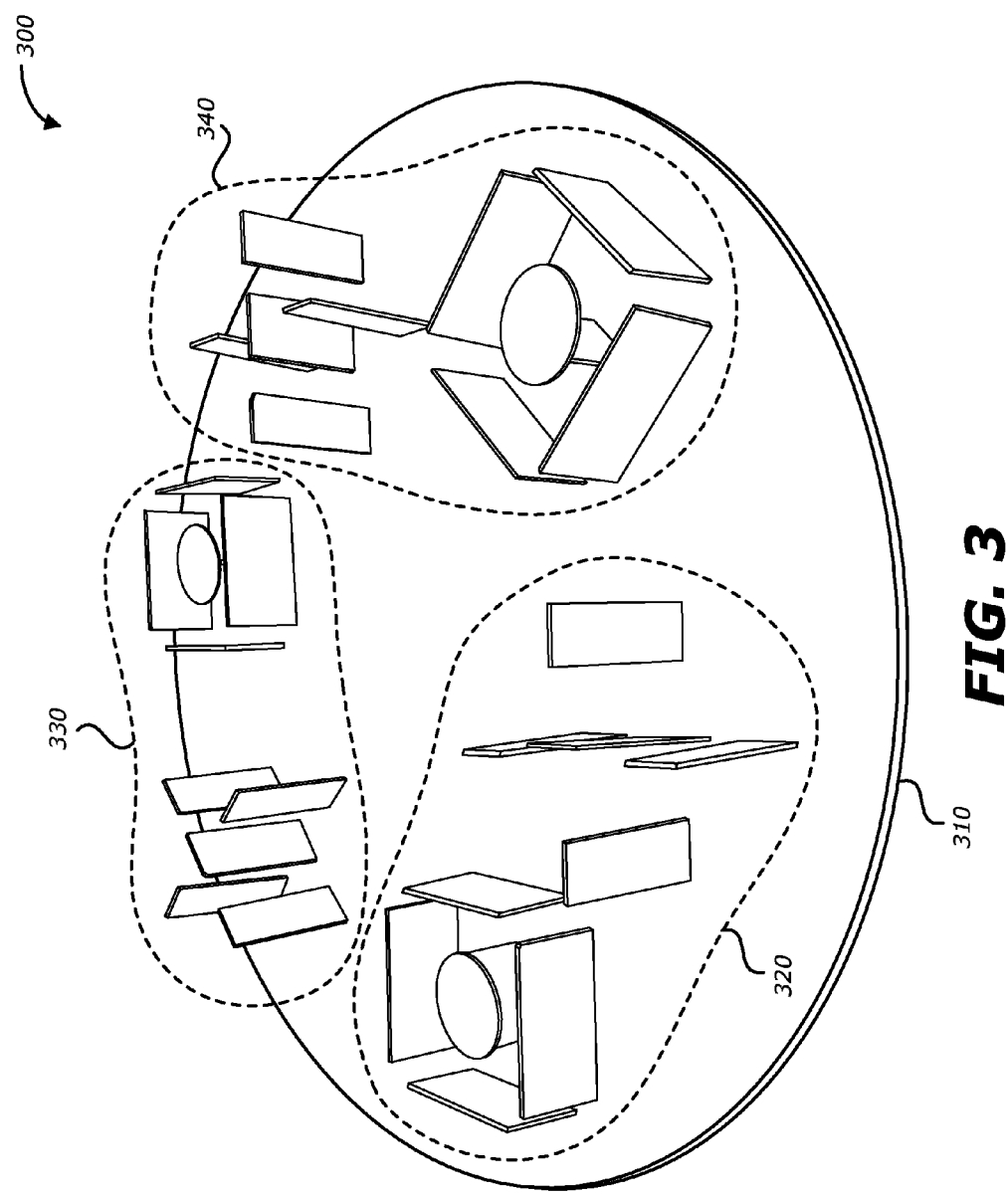
FIG. 3 illustrates an exemplary configurable antenna system.

FIG. 3 illustrates an exemplary configurable antenna system 300 according to one embodiment of the disclosure. Antenna system 300 includes a base 310 and three individually configurable antenna circuitries 320, 330, and 340. In alternative embodiments, antenna system 300 may include only two individually configurable antenna circuitries, or may include more than three individually configurable antenna circuitries. The number of individually configurable antenna circuitries does not limit the invention. Each individually configurable antenna circuitry may corresponds to an RF chain of the MIMO-capable radio module to which configurable antenna system 300 is coupled, such as radio module 230. Each individually configurable antenna circuitry is capable of being configured to radiate RF signals with either an omnidirectional radiation pattern or a directional beam pattern. In addition to the configurable beam direction, beam width, peak gain, and polarization of the beams may also be configurable for each individually configurable antenna circuitry. Hereinafter omnidirectional pattern/directional beam selection, and beam direction, beam width, peak gain, and polarization of a directional beam for each individually configurable antenna circuitry may be referred to collectively as the antenna configuration. It should be noted that the definition of an antenna circuitry within the present disclosure is not necessarily consistent with the definitions of the same term in other patent applications or patents assigned to Aruba Networks Inc. It should be further noted that configurable antenna systems different from the one shown in FIG. 3 may also be used with embodiments of the disclosure. Exemplary configurable antenna system 300 of FIG. 3 is illustrative and does not limit the invention.

Embodiments of the disclosure divide DL MU-MIMO-capable client devices, such as client devices 120, 125, 130, 135, 140, and 145 into groups. Client devices within the same group receive simultaneous DL transmissions from wireless network device 110 according to MU-MIMO specified in the IEEE 802.11ac standard. The transmissions are formatted on the media access control (MAC) layer according to the standard MU-MIMO For example, standard MU-MIMO aggregated-MAC data protocol units (A-MPDUs) including without limitation appropriate Very High Throughput (VHT)-Signal A (VHT-SIG-A) preamble fields are constructed. Of course, appropriate VHT-SIG-A fields include Group ID and information relating to user positions within the group, as specified in the IEEE 802.11ac standard. Therefore, from the standpoint of the client devices, they are participating in standard MU-MIMO transmissions. It should be noted that one client device may belong to more than one groups. During each MU-MIMO burst, each individually configurable antenna circuitry, such as antenna circuitries 320, 330, and 340, transmits to one client device exclusively. More than one individually configurable antenna circuitries may transmit to a single client device during an MU-MIMO burst if the client device is capable of decoding more than one spatial streams.

During an MU-MIMO burst, an individually configurable antenna circuitry transmits to its respective client device with an optimized antenna configuration. Multiple known methods may be utilized to find a good antenna configuration for a client device. For example, Quality of Service (QoS) NULL data frames may be used to find good antenna configurations. The direction and/or angle of arrival of an RF chain associated with a client device may be useful in selecting a good antenna configuration for communications with the client device through the RF chain. Any of a number of methods for determining the direction and/or angle of arrival of the RF chain may be utilized. For example, individual antenna circuitries of the antenna system may be configured to simultaneously receive the single RF chain, each antenna circuitry being configured with a different configuration. The direction and/or angle of arrival of the RF chain may then be estimated based on how the individual antenna circuitries with different configurations receive the RF chain. Information derived from normal data exchanges may also be used to find good antenna configurations. Furthermore, the standard sounding-feedback process is also a possible method for finding good antenna configurations, although it is not required. Of course, the antenna configurations and the grouping of client devices may be continuously and dynamically updated and refined during normal operation of the system through a process of trial and error with the assistance of newly available information. Environmental changes and new user associations are examples of events that may prompt regrouping of client devices. Objectives of refining antenna configurations and the grouping and regrouping of client devices include increasing isolation among spatial streams intended for different client devices within the same group (i.e., reducing inter-user interference) and increasing de-correlation among simultaneous spatial streams intended for the same client device. It should be appreciated that the theoretically best antenna configurations and client device grouping are not required for satisfactory operations of the system.

With individually configurable antenna circuitries 320, 330, and 340 of antenna system 300, the sounding-feedback process used for the standard DSP-based beamforming is no longer required, although it may be performed with a low frequency, e.g., once every few seconds, to spoof client devices into believing that standard MU-MIMO transmissions are taking place, in case such spoofing is necessary. As described above, the result of the sounding-feedback process may be used for finding good antenna configurations or for refining antenna configurations. Steering matrices, as used in the standard DSP-based beamforming, need not be calculated, and are not applied.

Figure 4:
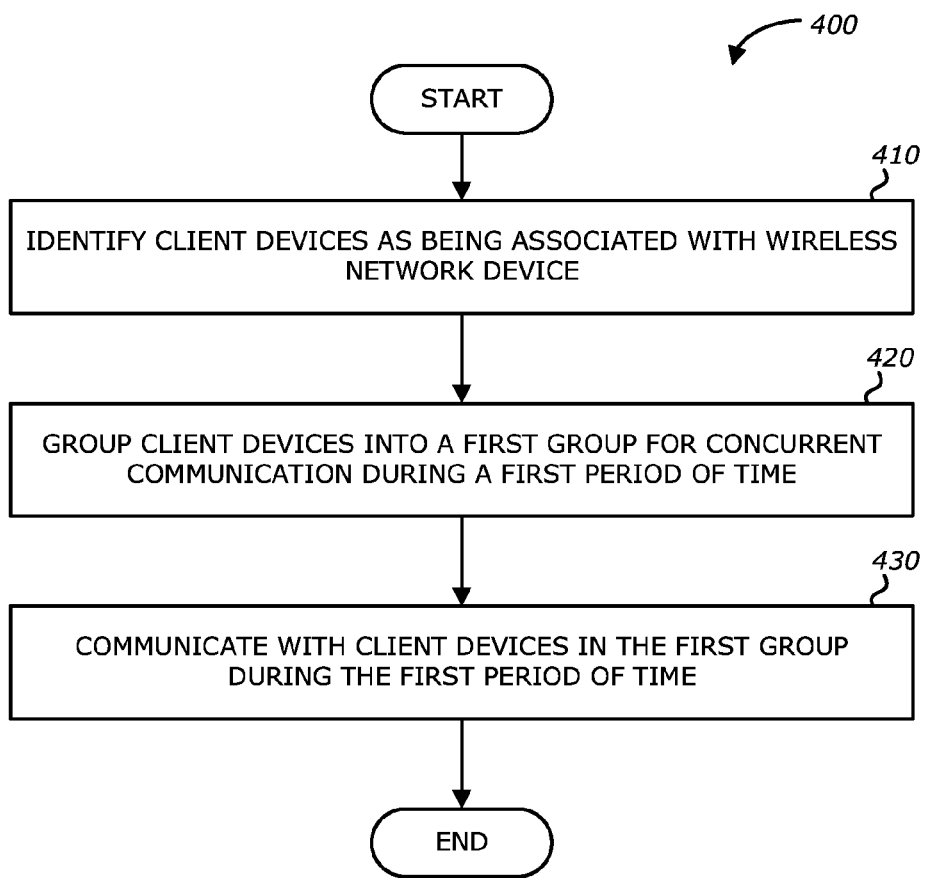
FIG. 4 is a flowchart illustrating an exemplary method for grouping client devices into a single group for simultaneous MU-MIMO transmissions with individually configurable antenna circuitries.

Referring to FIG. 4, a flowchart illustrating an exemplary method 400 for grouping a plurality of client devices into a single group for simultaneous MU-MIMO transmissions with individually configurable antenna circuitries is shown. At block 410, a plurality of client devices, such as client devices 120, 125, 130, 135, 140, and 145 of FIG. 1 may be identified by wireless network device 110 as being associated with wireless network device 110. Next, at block 420, a first subset of the plurality of client devices may be grouped into a first group for concurrent communication during a first period of time using a plurality of antenna circuitries. For example, the first subset of client devices being grouped into the first group may include client devices 120 and 130, and the plurality of antenna circuitries may include individually configurable antenna circuitries 320, 330, and 340. Each antenna circuitry may be configured for communication with a respective single device in the first group during the first period of time with one of a number of different RF chains. In other words, each antenna circuitry may correspond to a different RF chain during the first period of time. For example, individually configurable antenna circuitries 320 and 330 may be configured for communication with client device 120, and individually configurable antenna circuitry 340 may be configured for communication with client device 130. In other words, individually configurable antenna circuitries 320 and 330 may be configured for communication with the same client device 120 during the first period of time. Members of the first group may be selected based at least on a first interference value between sets of wireless signals transmitted between wireless network device 110 and the corresponding client devices 120 and 130 in the first group. An interference value may include, for example, a de-correlation value.

Multiple methods may be utilized to compute the first interference value. For example, in one embodiment, for each client device, an antenna configuration for one or more of the individually configurable antenna circuitries may be first identified. Then, different combinations of client devices to be included in the first subset of client devices may be selected, and for each combination, respective de-correlation values may be determined using the respective antenna configurations identified for each client device. Thereafter, the combination of client devices with the maximum de-correlation value may be selected.

In another embodiment, to compute the first interference value, a direction and/or angle of arrival of the RF chain is first estimated for each client device by simultaneously receiving the RF chain with a plurality of individually configurable antenna circuitries, each antenna circuitry being configured with a different antenna configuration. Then, different combinations of client devices to be included in the first subset of client devices may be selected, and for each combination, respective de-correlation values may be determined based on the direction and/or angle of arrival of the RF chain estimated for each of the client devices. Thereafter, the combination of client devices with the maximum de-correlation value may be selected.

A high de-correlation value may indicate, for example, a high level of isolation among spatial streams intended for different client devices within the same group and/or a high level of de-correlation among simultaneous spatial streams intended for the same client device.

It should be appreciated that the first interference value between sets of wireless signals transmitted between wireless network device 110 and the corresponding client devices 120 and 130 in the first group may be dynamically re-computed, and based on the dynamically re-computed first interference value, members of the first group may be dynamically added and/or removed.

Thereafter, at block 430, wireless network device 110 may communicate with client devices 120 and 130 in the first group using individually configurable antenna circuitries 320, 330, and 340 such that each individually configurable antenna circuitry is transmitting messages directed to the respective single client device in the first group during the first period of time. Each individually configurable antenna circuitry may communicate with its respective client device with the MU-MIMO format as specified in the IEEE 802.11ac standard.

Concurrent with block 420, a second subset of client devices may be grouped into a second group for concurrent communication during a second period of time using the plurality of antenna circuitries. For example, the second subset of client devices being grouped into the second group may include client devices 125, 135, and 140. Each antenna circuitry is configured for communication with a respective single client device in the second group during the second period of time. For example, individually configurable antenna circuitries 320, 330, and 340 may be configured for communication with client devices 125, 135, and 140, respectively. Members of the second group may be selected based at least on a second interference value between sets of wireless signals transmitted between wireless network device 110 and the corresponding client devices 125, 135, and 140 in the second group.

After block 430, during the second period of time, wireless network device 110 may communicate with client devices 125, 135, and 140 in the second group using individually configurable antenna circuitries 320, 330, and 340 such that each individually configurable antenna circuitry is transmitting messages directed to the respective single client device in the second group.

Figure 5:
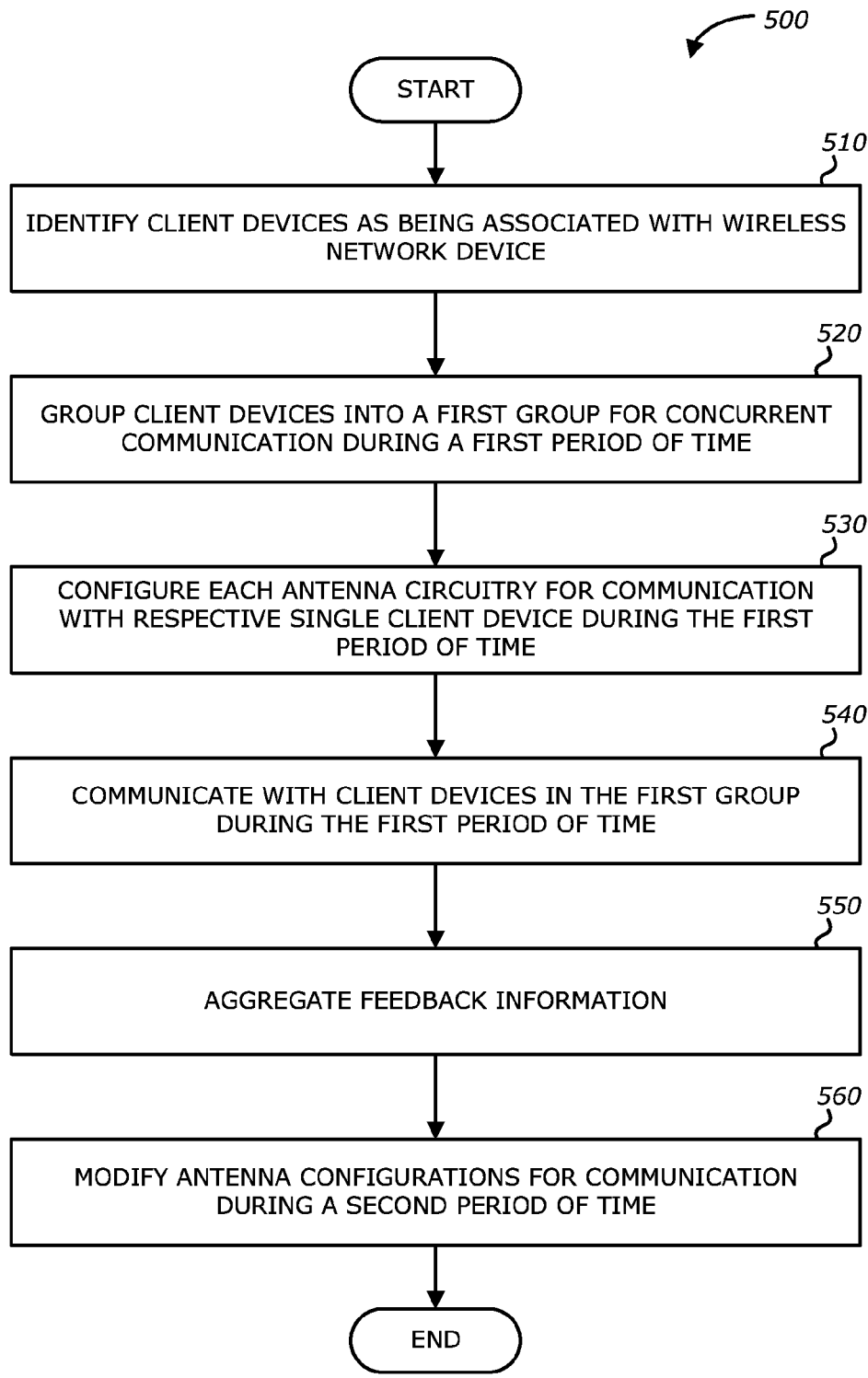
FIG. 5 is a flowchart illustrating an exemplary method for grouping client devices into a single group for simultaneous MU-MIMO transmissions with individually configurable antenna circuitries and for updating the antenna configurations.

Referring to FIG. 5, a flowchart illustrating an exemplary method 500 for grouping a plurality of client devices into a single group for simultaneous MU-MIMO transmissions with individually configurable antenna circuitries and for updating the antenna configurations is shown. At block 510, a plurality of client devices, such as client devices 120, 125, 130, 135, 140, and 145 of FIG. 1 may be identified by wireless network device 110 as being associated with wireless network device 110. Next, at block 520, a first subset of the plurality of client devices may be grouped into a first group for concurrent communication during a first period of time using a plurality of antenna circuitries. For example, the first subset of client devices being grouped into the first group may include client devices 120 and 130, and the plurality of antenna circuitries may include individually configurable antenna circuitries 320, 330, and 340. Each antenna circuitry may be configured for communication with a respective single device in the first group during the first period of time. For example, individually configurable antenna circuitries 320 and 330 may be configured for communication with client device 120, and individually configurable antenna circuitry 340 may be configured for communication with client device 130. Members of the first group may be selected based at least on a first interference value between sets of wireless signals transmitted between wireless network device 110 and the corresponding client devices 120 and 130 in the first group.

Next, at block 530, each of individually configurable antenna circuitries 320, 330, and 340 may be configured with a respective antenna configuration for communication with the respective single client device in the first group during the first period of time. Thereafter, at block 540, wireless network device 110 may communicate with client devices 120 and 130 in the first group using individually configurable antenna circuitries 320, 330, and 340 such that each individually configurable antenna circuitry is transmitting messages directed to the respective single client device in the first group during the first period of time.

Thereafter, at block 550, feedback information for the communication with client devices 120 and 130 may be aggregated. Feedback information may include information relating to signal quality, signal-to-noise ratio (SNR), throughput, and error rate, etc. At block 560, based on the feedback information aggregated at block 550, the respective antenna configurations for one or more individually configurable antenna circuitries 320, 330, and 340 may be modified for communication during a second period of time. The respective antenna configurations for one or more individually configurable antenna circuitries 320, 330, and 340 may include radiation patterns. Modifying the respective configurations for one or more individually configurable antenna circuitries 320, 330, and 340 may improve an aggregated signal quality metric for the first subset of client devices, and/or may improve an aggregated performance metric. In addition, it may be possible to add a client device to or remove a client device from the first group based on the feedback information aggregated at block 550.

Figure 6:
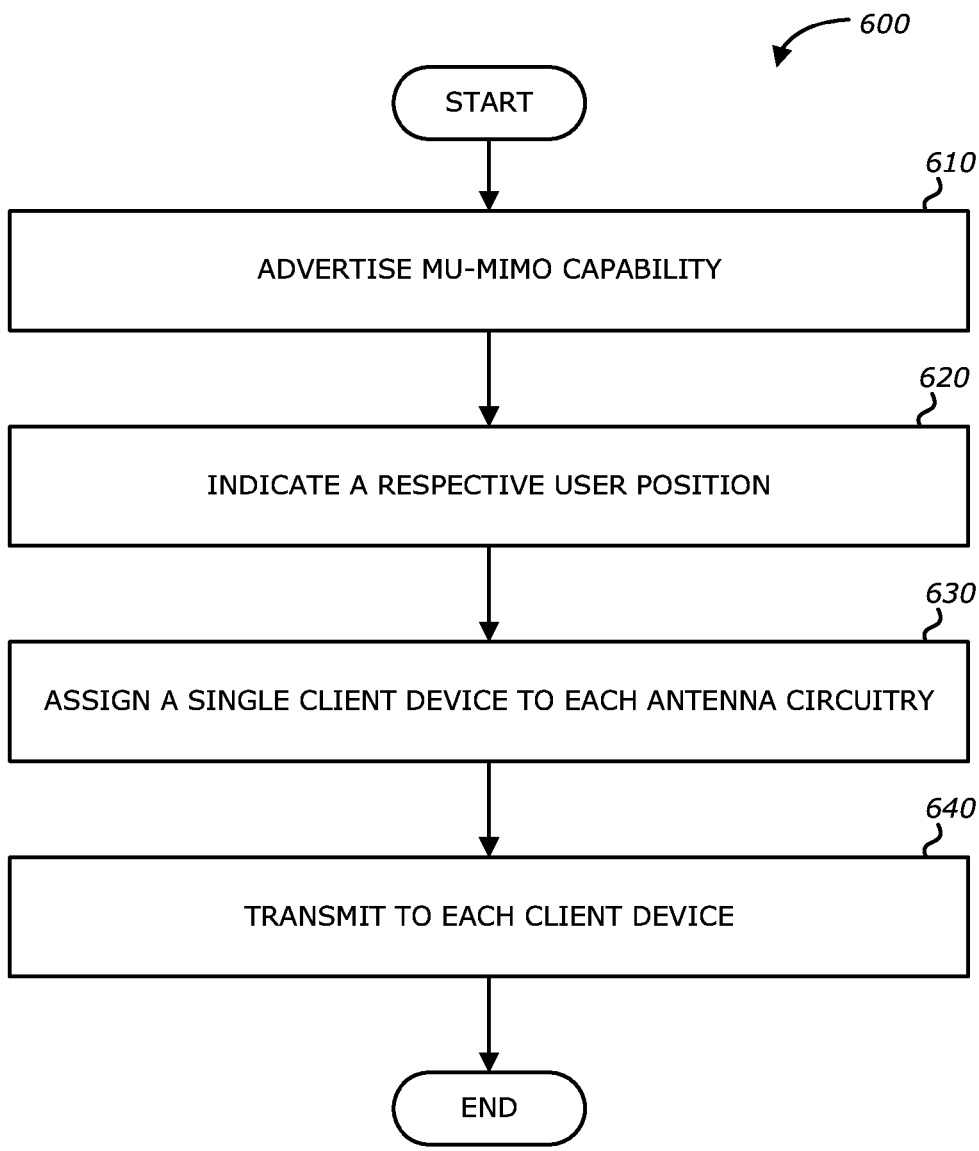
FIG. 6 is a flowchart illustrating an exemplary method for transmitting data in accordance to the standard MU-MIMO format with individually configurable antenna circuitries.

Referring to FIG. 6, a flowchart illustrating an exemplary method 600 for transmitting data in accordance to the standard MU-MIMO format with individually configurable antenna circuitries is shown. At block 610, wireless network device 110 may advertise MU-MIMO capability for communicating with a plurality of client devices, such as client devices 120, 125, 130, 135, 140, and 145. Next, at block 620, wireless network device 110 may indicate to each client device a respective user position for receiving communication in accordance with a MU-MIMO configuration. For example, client devices 120, 130, and 135 may be grouped into the first MU-MIMO group for communication during the first period of time, in that order, and client devices 125, 140, and 145 may be grouped into the second MU-MIMO group for communication during the second period of time, in that order. Next, at block 630, wireless network device 110 may assign to each of the individually configurable antenna circuitries 320, 330, and 340 a single respective client device for communication during a first period of time. For example, client device 125, 140, and 145 may be assigned to individually configurable antenna circuitries 320, 340, and 330, respectively. Thereafter, at block 640, wireless network device 110 may transmit, using each antenna circuitry 320, 330, and 340 during the first period of time, a respective data set to each single respective client device 125, 145, and 140. In particular, wireless network device 110 may transmit PDUs of the respective data sets formatted in accordance with MU-MIMO format without using DSP-based beamforming techniques. For example, standard MU-MIMO A-MPDUs including without limitation appropriate VHT-SIG-A preamble fields may be constructed. Of course, appropriate VHT-SIG-A fields may include Group ID and information relating to user positions within the group, as specified in the IEEE 802.11ac standard. Thereafter, each particular client device 125, 145, and 140 may process received respective data sets as data packets in accordance with MU-MIMO processing techniques.

Figure 7:
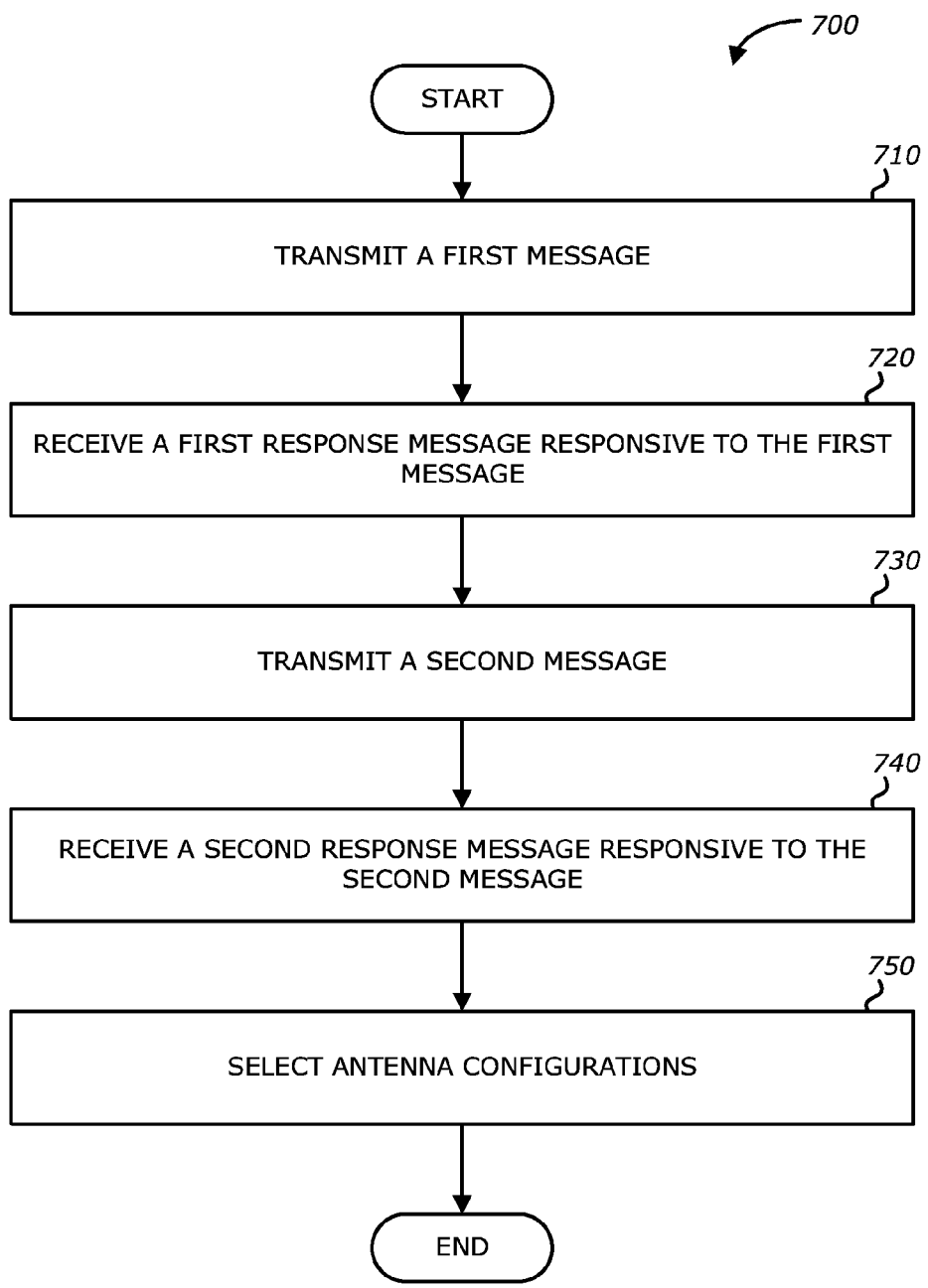
FIG. 7 is a flowchart illustrating an exemplary method for selecting antenna configurations for individually configurable antenna circuitries.

Referring to FIG. 7, a flowchart illustrating an exemplary method 700 for selecting antenna configurations for individually configurable antenna circuitries is shown. In one embodiment, the explicit sounding-feedback process specified in the IEEE 802.11 standards may be used to select and/or refine antenna configurations for communications with client devices within a group. At block 710, wireless network device 110 may transmit to wireless client devices 120 and 130 a first message using a first antenna configuration. At block 720, wireless network device 110 may receive from each of wireless client devices 120 and 130 a first response message responsive to the first message. At block 730, wireless network device 110 may transmit to wireless client devices 120 and 130 a second message. At block 740, wireless network device 110 may receive from each of wireless client devices 120 and 130 a second response message responsive to the second message in the frame exchange sequence. The first and second messages may be, for example, sounding frames such as null data packet (NDP) frames. And the first and second response messages may be feedback frames including channel state information. Thereafter, at block 750, wireless network device 110 may select and/or update antenna configurations for communicating with wireless client devices 120 and 130 based at least on the first response messages and the second response messages. Antenna configurations may be selected based at least on first signal strengths characteristic of the first response messages and second signal strengths characteristics of the second response messages. Additionally or alternatively, the antenna configurations may be selected based at least on first feedback information in the first response messages and second feedback information in the second response messages. After block 750, wireless network device 110 may transmit data to wireless client devices 120 and 130 using the selected antenna configurations.

It should be appreciated that the number of client devices within a group does not limit the invention, and the exemplary method 700 may be adapted for scenarios where more than two client devices exist in the group. For example, if in addition to wireless client devices 120 and 130, the group further comprises wireless client device 135, wireless network device 110 may transmit the first and second messages to all client devices in the group, including client devices 120, 130, and 135, and may receive the first and second response messages from all client devices in the group, including client devices 120, 130, and 135. And in this case, based on first and second response messages, wireless network device 110 may select antenna configurations for communicating with wireless client devices 120, 130, and 135. As described above, the sounding-feedback process need not be performed frequently. In some embodiments, the sounding-feedback process may be performed once every few seconds. In other words, a relatively long period of time, e.g., a few seconds, may lapse between the transmissions of the first message and of the second message.

It should be noted that the numbering (first, second, etc.) of antenna circuitries, client devices, groups, time periods, etc., may not be consistent across descriptions of different embodiments as illustrated in different figures (i.e., FIGS. 4-7). Further, it should be appreciated that all the corresponding relationships between client devices and antenna circuitries and all the specific groupings of client devices described herein are examples for illustrative purposes only, and do not limit the invention in any way.

Therefore, embodiments of the disclosure utilize antenna beamforming techniques to simultaneously transmit to a plurality of client devices by simulating the standard MU-MIMO transmissions. Standard-compliant client devices may be used without modifications. The need for frequent sounding-feedback processes is eliminated, and the overall performance of MU-MIMO transmissions may be improved.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer-readable medium comprising instructions which, when executed by one or more hardware processors, cause performance of operations comprising:
   identifying a plurality of client devices associated with a particular wireless network device;
   grouping a first subset of the plurality of client devices into a first group for concurrent communication during a first period of time using a plurality of antenna circuitries in the particular wireless network device such that each antenna circuitry, in the plurality of antenna circuitries, is to communicate with a respective single client device in the first group during the first period of time, wherein members of the first group are selected based at least on a first interference value between sets of wireless signals transmitted between the particular wireless network device and the corresponding client devices in the first group; and
   concurrently communicating with client devices in the first group using the plurality of antenna circuitries such that each antenna circuitry, in the plurality of antenna circuitries, is transmitting messages directed to the respective single client device in the first group during the first period of time without the use of steering matrices.

2. The non-transitory computer-readable medium of claim 1, wherein the respective single client device for a first antenna circuitry in the plurality of antenna circuitries and the respective single client device for a second antenna circuitry are a same client device.

3. The non-transitory computer-readable medium of claim 1, wherein the operations further comprise:
   grouping a second subset of the plurality of client devices into a second group for concurrent communication during a second period of time using the plurality of antenna circuitries such that each antenna circuitry, in the plurality of antenna circuitries, is configured for communication with a respective single client device in the second group during the second period of time, wherein members of the second group are selected based at least on a second interference value between sets of wireless signals transmitted between the particular wireless network device and the corresponding client devices in the second group; and
   concurrently communicating with client devices in the second group using the plurality of antenna circuitries such that each antenna circuitry, in the plurality of antenna circuitries, is transmitting messages directed to the respective single client device in the second group during the second period of time.

4. The non-transitory computer-readable medium of claim 1, wherein each antenna circuitry of the plurality of antenna circuitries corresponds to a different radio frequency (RF) chain during the first period of time.

5. The non-transitory computer-readable medium of claim 1, wherein the operations further comprise:
   dynamically re-computing the first interference value between sets of wireless signals transmitted between the particular wireless network device and the corresponding client devices in the first group; and
   dynamically adding and/or removing members of the first group based on the dynamically re-computed first interference value.

6. The non-transitory computer-readable medium of claim 1, further comprising transmitting packets in accordance with a Multi-User Multiple-Input Multiple Output (MU-MIMO) format using a single antenna circuitry.

7. The non-transitory computer-readable medium of claim 1, wherein the operations further comprise computing the first interference value at least by:
   for each client device of the plurality of client devices, identifying an antenna configuration for one or more of the plurality of antenna circuitries;
   selecting different combinations of client devices to include in the first subset of client devices, and for each combination, determining respective decorrelation values using the respective antenna configurations identified for each of client devices; and
   selecting a combination of client devices with a maximum de-correlation value.

8. The non-transitory computer-readable medium of claim 1, wherein the operations further comprise computing the first interference value at least by:
   for each client device of the plurality of client devices, estimating a direction and/or angle of arrival of a radio frequency (RF) chain associated with the client device by simultaneously receiving the radio frequency (RF) chain with a plurality of antenna circuitries, each antenna circuitry being configured with a different antenna configuration;
   selecting different combinations of client devices to include in the first subset of client devices, and for each combination, determining respective de-correlation values based on the direction and/or angle of arrival of the radio frequency (RF) chain estimated for each of the client devices; and
   selecting a combination of client devices with a maximum de-correlation value.

9. The non-transitory computer-readable medium of claim 1, wherein the first interference value comprises a first de-correlation value.

10. A non-transitory computer-readable medium comprising instructions which, when executed by the one or more hardware processors, cause performance of operations comprising:
    identifying a plurality of client devices associated with a particular wireless network device;
    grouping a first subset of the plurality of client devices into a first group for concurrent communication during a first period of time using a plurality of antenna circuitries in the particular wireless network device such that each antenna circuitry, in the plurality of antenna circuitries, is to communicate with a respective single client device in the first group during the first period of time;

configuring each of the plurality of antenna circuitries with a respective configuration for communication with the respective single client device in the first group during the first period of time;

simulating a standard MU-MIMO transmission by concurrently communicating with client devices in the first group using the plurality of antenna circuitries such that each antenna circuitry, in the plurality of antenna circuitries, is transmitting messages, without use of steering matrices, directed to the respective single client device in the first group while using the respective configuration during the first period of time;

aggregating feedback information for the communication with the plurality of client devices; and based on the aggregated feedback information: modifying the respective configurations for one or more antenna circuitries, in the plurality of antenna circuitries, for communication during a second period of time.

11. The non-transitory computer-readable medium of claim 10, wherein the operations further comprise based on the aggregated feedback information, adding a client device or removing a client device from the first group.

12. The non-transitory computer-readable medium of claim 10, wherein the respective configurations for the plurality of antenna circuitries comprise respective antenna radiation patterns.

13. The non-transitory computer-readable medium of claim 10, wherein modifying the respective configurations for one or more antenna circuitries improves an aggregated signal quality metric for the first subset of the plurality of client devices.

14. The non-transitory computer-readable medium of claim 10, wherein modifying the respective configurations for one or more antenna circuitries based on the aggregated feedback information improves an aggregated performance metric.

15. A non-transitory computer-readable medium comprising instructions which, when executed by one or more hardware processors, cause performance of operations comprising:

advertising, by a particular wireless network device, Multi-User Multiple-Input Multiple-Output (MU-MIMO) capability for communicating with a plurality of client devices;

indicating, to each client of the plurality of client devices, a respective user position for receiving communication in accordance with a MU-MIMO configuration;

assigning to each antenna circuitry, in a plurality of antenna circuitries, a single respective client device of the plurality of client devices for communication during a first period of time; and transmitting, using each antenna circuitry during the first period of time, a respective data set to each single respective client device without use of steering matrices.

16. The non-transitory computer-readable medium of claim 15, wherein particular wireless network device transmits Protocol Data Units (PDUs) of the respective data sets formatted in accordance with MU-MIMO format without using Digital Signal Processing (DSP)-based beamforming techniques.

17. The non-transitory computer-readable medium of claim 15, wherein the respective data sets, received by each particular client device of the plurality of client devices, is processed by the particular client device as data packets in accordance with MUMIMO processing techniques.

18. A non-transitory computer-readable medium comprising instructions which, when executed by one or more hardware processors, cause performance of operations comprising:

transmitting without use of steering matrices, by a network device to a first wireless device and a second wireless device, a first message using a first antenna configuration;

receiving, by the network device from each of the first wireless device and the second wireless device, a first response message responsive to the first message;

transmitting without use of steering matrices, by the network device to the first wireless device and the second wireless device, a second message using a second antenna configuration;

receiving, by the network device from each of the first wireless device and the second wireless device, a second response message responsive to the second message; and selecting antenna configurations for communicating by the network device with the first wireless device and the second wireless device based at least on the first response messages and the second response messages.

19. The non-transitory computer-readable medium of claim 18, wherein the antenna configurations are selected based at least on first signal strengths characteristic of the first response messages and second signal strengths characteristics of the second response messages.

20. The non-transitory computer-readable medium of claim 18, wherein the antenna configurations are selected based at least on first feedback information in the first response messages and second feedback information in the second response messages.

21. The non-transitory computer-readable medium of claim 18, further comprising using the selected antenna configurations to transmit data to the first wireless device and the second wireless device.

22. The non-transitory computer-readable medium of claim 18, wherein the network device transmits the first message and the second message further to a third wireless device, receives a further first response message and a further second response message from the third wireless device, and wherein an antenna configuration for communicating with the third device is further selected based on the first response messages and the second response messages.

* * * * *